April 22, 1969  N. L. DE JARLD ET AL  3,440,524
TEST CIRCUIT FOR DETERMINING WHETHER A PLURALITY OF ELECTRICAL
SWITCHES OPERATE IN A PRESCRIBED BREAK SEQUENCE
Filed June 3, 1964
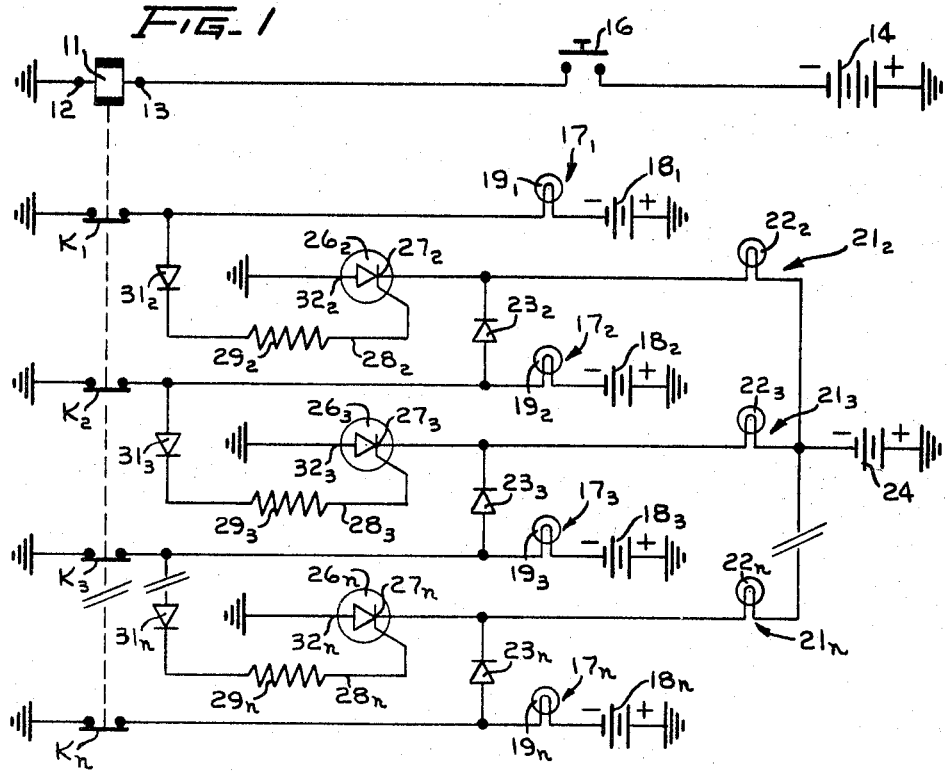
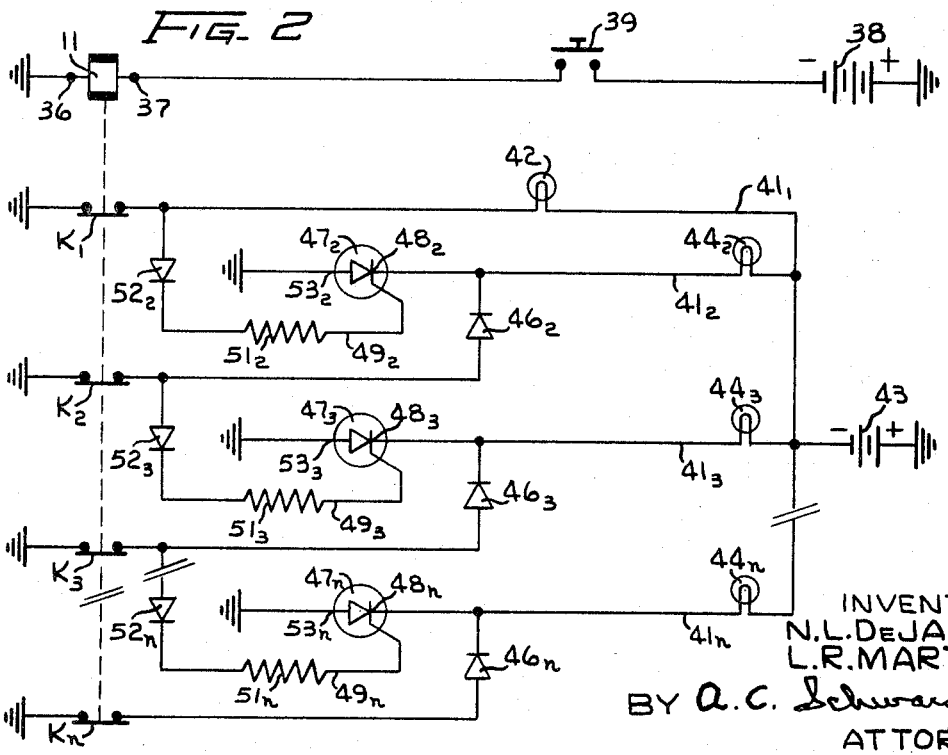
INVENTORS
N.L. DeJARLD
L.R. MARTIN
BY A.C. Schwarz, Jr.
ATTORNEY United States Patent Office 3,440,524
Patented Apr. 22, 1969

3,440,524
TEST CIRCUIT FOR DETERMINING WHETHER A PLURALITY OF ELECTRICAL SWITCHES OPERATE IN A PRESCRIBED BREAK SEQUENCE
Norman L. De Jarld, Lockport, and Laurence R. Martin, Westchester, Ill., assignors to Western Electric Company Incorporated, New York, N.Y., a corporation of New York
Filed June 3, 1964, Ser. No. 372,225
Int. Cl. G01r 31/02
U.S. Cl. 324—28         8 Claims

ABSTRACT OF THE DISCLOSURE

A relay, having a plurality of contact pairs that are opened in sequence upon energization of the relay, is checked for (1) the opening of each contact pair and (2) the sequence in which the contact pairs open. If the pairs of contacts open in the correct sequence, a switching circuit remains disabled. However, if any pair of contacts open before the pair of contacts which are arranged to open immediately prior to them is open, the corresponding switching circuit is enabled to light an indicator lamp and identify the pair of contacts which opened out of sequence.

---

The present invention relates generally to circuits for testing whether a plurality of electrical switches operate in a prescribed sequence, and more particularly to a circuit for automatically testing whether a plurality of relay contacts break contact in a prescribed sequence when the relay is energized.

In the communication arts, it is often necessary that switches or relay contacts operate in a prescribed sequence. For example, in telephone exchange equipment, high speed relays utilized in step-by-step switching systems have a plurality of contacts which must break contact in a prescribed sequence. In the past, such relays were tested for an improper break-contact sequence by manually manipulating the armature of the relay and visually observing the contacts as they break contact, with or without the aid of auxiliary optical equipment.

This test procedure yielded unsatisfactory results because of the difficulty encountered in visually observing with any degree of accuracy just when a set of contacts break contact. This problem is greatly intensified when it is considered that in the above test procedure an operator must observe a plurality of contacts not only to see when each set breaks contact, but also to see whether all of the contacts break contact in the prescribed sequence. In addition, manual manipulation of the armature may distort the armature and/or the contacts, and further does not accurately simulate the actual operating conditions under which the relay must perform satisfactorily in use.

Accordingly, a general object of the invention is to provide a new and improved circuit for testing whether a plurality of electrical switches operate in a prescribed sequence, which circuit provides an accurate indication not dependent upon external measurement or visual observation, but dependent only upon the inherent function and operation of the switch itself to determine its satisfactory operation.

Another object of the invention is to provide a new and improved circuit for automatically testing whether a plurality of relay contacts break contact in a prescribed sequence when the relay is energized, wherein the inherent function and operation of the relay and its contacts are utilized to determine its satisfactory operation, and wherein the relay is electrically energized and the break-contact sequence electrically monitored through the contacts themselves so that the relay is tested under conditions duplicating its operation in actual use to provide reliable test results.

Still another object of the invention is to provide a circuit for testing first whether a plurality of contacts break contact, and secondly whether the contacts break contact in a prescribed sequence, wherein each set of contacts is utilized to interrupt a portion of the test circuit to determine exactly if and when the contacts break contact, wherein each set of contacts and associated circuit portion are so related that the opening of any set of contacts out of sequence is registered by the test circuit, and wherein a separate indicating means for each set of contacts readily identifies the set or sets which did not break contact or which broke contact out of sequence.

A further object of the invention is to provide a circuit for automatically testing whether a plurality of relay contacts are closed in their normal condition, and upon energization of the relay whether the contacts break contact and further whether the contacts break contact in a prescribed sequence, wherein an indicating device is provided for each set of contacts to identify readily any set of contacts which is not closed in its normal condition or which does not break contact when the relay is energized and wherein a separate indicating device is provided for each set of contacts which readily identifies any set of contacts which breaks contact out of sequence, so that not only is the defective set of contacts identified but also the fault.

A still further object of the invention is to provide a test circuit in accordance with the preceding object wherein the circuitry is capable of accommodating the extremely fast switching times of modern switching equipment, such as is used in present telephone exchange systems, to simulate actual operating conditions in energizing the relay and accurately detecting an improper sequence of operation of the contacts, and wherein a simple, uncomplicated test circuit is provided which is readily adaptable to meet the varying requirements encountered in testing modern high speed switching devices.

A circuit accomplishing the above and other objects in accordance with the invention includes a control element associated individually with each of a plurality of electrical switches to be tested for operation in a prescribed sequence except the first switch in the prescribed sequence, each of which control elements is responsive to operation of the associated switch and the next preceding switch in the prescribed sequence to complete an energizing circuit for an indicating device if the switches operate out of sequence.

In accordance with a preferred embodiment of the invention, a circuit is provided for automatically testing whether a plurality of relay contacts are closed in their normal condition, and upon energization of the relay whether the contacts break contact and further whether the contacts break contact in a prescribed sequence. The test circuit includes circuitry actuatable to energize the relay, and a plurality of first parallel circuit portions, one associated individually with and arranged to receive each set of contacts so that an energizing circuit is completed for a first indicating device as long as the associated set of contacts remain in their normal closed condition.

A plurality of second parallel circuit portions are provided, one for each set of contacts after the first in the prescribed break-contact sequence so that an energizing circuit is completed for a second indicating device as long as the associated set of contacts remain in their normal closed condition. A control element is provided for each set of contacts after the first in the break-contact sequence and is responsive to interruption of the corresponding second circuit portion and to interruption of at least one of the first and second circuit portions associated with the next preceding set of contacts in the prescribed break-contact sequence, to complete an alternate energizing circuit for the second indicating device associated therewith if the contacts break contact out of sequence.

At the commencement of the test, those of the first indicating devices which are not energized identify the set or sets of contacts which are not properly closed in their normal condition. Upon energization of the relay by actuation of the relay-energizing circuitry, those of the first indicating devices which remain energized after completion of the test identify the set or sets of contacts which failed to break contact, and those of the second indicating devices which remain energized after completion of the test identify the set or sets of contacts which broke contact out of sequence.

The above and other objects, advantages, and aspects of the invention will become apparent from the following detailed description of alternative embodiments thereof when taken in conjunction with the appended drawing, in which:

FIG. 1 is a schematic diagram of a preferred test circuit in accordance with the invention; and FIG. 2 is a schematic diagram of an alternative embodiment of the invention.

Turning now to the drawing and specifically to FIG. 1, a relay 11 having a plurality of normally closed contacts $K_1$, $K_2$, $K_3$ ... $K_n$ is to be tested to determine (1) whether the contacts are closed in their normal condition, (2) whether the contacts break contact when the relay is energized, and (3) whether the contacts break in a prescribed sequence when the relay is energized. In accordance with the usual convention for the break-contact sequence of a multiple contact relay, the contacts closest to the relay armature break contact first and the remaining contacts break contact in the order of increasing remoteness from the relay armature. Hence as shown in FIG. 1, the contacts $K_1$ are to break contact first, then contacts $K_2$, $K_3$ ... $K_n$, in that order. It is to be emphasized that while the contacts of a multiple contact relay are shown, separate switches or contacts of separate relays may be tested in a like manner.

The relay 11 is arranged between two terminals 12 and 13 in an energizing circuit including a negative battery 14 and a push-button switch 16 so that energization thereof may be manually controlled. Each set of contacts $K_1$, $K_2$, $K_3$ ... $K_n$ is received in a corresponding one of a plurality of first parallel circuit portions, indicated generally by the numerals $17_1$, $17_2$, $17_3$ ... $17_n$, respectively. Each of the first parallel circuit portions $17_1$, $17_2$, $17_3$ ... $17_n$ is identical and therefore a description of one will suffice to explain their composition—appropriate subscripts being used to identify the components corresponding to each. A representative first circuit portion $17_1$ includes a negative source $18_1$ and an indicating lamp $19_1$. As is apparent, if the corresponding set of contacts, $K_1$ for example, is properly closed in their normal condition, an energizing circuit is completed for the associated lamp $19_1$; hence any set of contacts which is not properly closed in its normal condition may be identified by the corresponding non-energized lamp.

One of a plurality of second parallel circuit portions is also completed through each set of contacts after the first in the break-contact sequence, and is indicated generally by the numerals $21_2$, $21_3$ ... $21_n$ corresponding respectively to contacts $K_2$, $K_3$ ... $K_n$. Again, each second circuit portion is identical and hence only one will be described—the components in the others being identified by the appropriate subscript. A representative second circuit portion $21_2$ includes a second indicating lamp $22_2$ and a diode $23_2$ connected through the associated set of contacts $K_2$ between the terminals of a common negative source 24. Thus, the lamp $22_2$ will also be energized as a result of proper closure of the contacts in their normal condition; however, its function is not to indicate such proper closure of the contacts, but rather to indicate an improper break-contact sequence.

This function is accomplished by providing a control device such as a silicon controlled rectifier for each set of contacts after the first in the break-contact sequence—each silicon controlled rectifier being designated generally by the numeral 26 and being identified with the corresponding set of contacts by the appropriate subscript. The arrangement of each silicon controlled rectifier 26 is duplicated throughout the test circuit, and hence a description of one such arrangement will be treated as exemplary of the arrangement of each of them.

A cathode $27_2$ of the silicon controlled rectifier $26_2$ is connected intermediate the indicating lamp $22_2$ and the diode $23_2$ of the second circuit portion $21_2$ corresponding to the associated set of contacts $K_2$. A gate circuit $28_2$ includes a resistor $29_2$ and a diode $31_2$ and is connected to the first parallel circuit portion $17_1$ associated with the next preceding set of contacts $K_1$ in the prescribed break-contact sequence, intermediate the lamp $19_1$ and the contacts $K_1$. Finally, an anode circuit $32_2$ of the silicon controlled rectifier $26_2$ completes an alternate energizing circuit between the terminals of the negative source 24 for the associated second indicating lamp $22_2$.

It is to be noted at this point, that the negative sources 14, $18_1$ through $18_n$, and 24 are shown as separate sources merely for purposes of simplicity and clarity in the circuit diagram, and that in actual practice a single negative source is employed with common negative and ground (positive) connections for each of the separate sources shown in FIG. 1.

In operation, assuming that all of the contacts $K_1$, $K_2$, $K_3$ ... $K_n$ are properly closed in their normal condition, all of the lamps $19_1$ through $19_n$ and $22_2$ through $22_n$ will be energized. In this condition, a positive or ground potential is applied through the closed contacts $K_1$ through $K_{n-1}$ to the gate circuit $28_2$ through $28_n$ of the respective silicon controlled rectifier $26_2$ through $26_n$ which is normally sufficient to bias the same into a state of conduction. However, a positive or ground is also applied through the closed contacts $K_2$ through $K_n$ to the cathode $27_2$ through $27_n$ of the respective silicon controlled rectifier $26_2$ through $26_n$ sufficient to clamp the same in a non-conductive condition.

The break-contact sequence test is commenced by actuating the push-button switch 16 to energize the relay 11 which normally should cause the contacts $K_1$ through $K_n$ to break contact in the prescribed sequence. Assuming that each of the contacts break contact properly and in the prescribed sequence, the positive bias applied to the gate circuit $28_2$ through $28_n$ for the respective silicon controlled rectifiers $26_2$ through $26_n$ will be removed before the positive clamping bias applied to the respective cathode $27_2$ through $27_n$ of each is removed. Hence an alternate energizing circuit for the indicating lamps $22_2$ through $22_n$ is not completed and all lamps are extinguished.

That is, opening of the contacts $K_1$ extinguishes the lamp $19_1$ so that a negative potential is applied to the gate circuit $28_2$ of the silicon controlled rectifier $26_2$ while a positive clamping bias is still applied at the cathode $27_2$ thereof as a result of the momentarily delayed opening of the contacts $K_2$. Opening of the contacts $K_2$ causes deenergization of the indicating lamp $22_2$ and the indicating lamp $19_2$, and removes the positive bias from the cathode $27_2$ of the silicon controlled rectifier $26_2$ and from the gate circuit $28_3$ of the silicon controlled rectifier $26_3$, and so on.

If all of the contacts break contact properly, but in an improper sequence—for example, contacts $K_2$ opening before contacts $K_1$—the second indicating lamp $22_2$ associated with the contacts $K_2$ will be provided with an alternate energizing circuit by the silicon controlled rectifier $26_2$ so as to remain energized after the completion of the test. Specifically, opening of the contacts $K_2$ prior to the contacts $K_1$ removes the positive clamping bias applied to the cathode $27_2$ of the silicon controlled rectifier $26_2$ while the positive bias applied to the gate circuit $28_2$ of the silicon controlled rectifier $26_2$ remains.

The silicon controlled rectifier $26_2$ is therefore gated and an alternate energizing circuit for the lamp $22_2$ completed so as to indicate an improper break-contact sequence, whereas the energizing circuit for the indicating lamp $19_2$ is interrupted immediately upon opening of the contacts $K_2$ so that that lamp is extinguished. The silicon controlled rectifier $26_2$ remains conductive until the relay 11 is deenergized, at which time the positive clamping bias reappears at the cathode $27_2$ to render it non-conductive again. Thus, not only is an improper break-contact sequence detected, but the set or sets of contacts $K_2$, $K_3$ . . . $K_n$ which break contact out of sequence are readily identifiable by the respective indicating lamp $22_2$, $23_3$ . . . $22_n$.

Assuming that the contacts $K_2$ fail to break contact at all, both of the associated indicating lamps $19_2$ and $22_2$ would remain energized and hence would indicate such defect. This result obtains because the corresponding first and second parallel circuit portions $17_2$ and $21_2$ continue to complete the energizing circuits through the closed contacts $K_2$ for the lamps $19_2$ and $22_2$.

It is obvious that any number of sets of contacts may be tested in the above manner—the repetitive branches of the test circuit being adjusted accordingly. Further, the use of solid state components such as silicon controlled rectifiers permits the testing of high speed switches and relays. Thus, with the simple, uncomplicated test circuit described above, high speed, multiple contact relays may be automatically tested for proper closure of the contacts in a normal condition, proper opening of contacts in an energized condition, and a proper break-contact sequence upon energization.

Exemplary values for the components utilized in the preferred test circuit illustrated in FIG. 1 include:

Resistors $29_2$ . . . $29_n$ _____ohms__ 100
Batteries 14, $18_1$ . . . $18_n$, and 24 _____volts__ −48

The silicon controlled rectifiers $26_2$ . . . $26_n$ are each catalogue item No. 2N1595 of the Texas Instrument Company, the diodes are Western Electric Company No. 440A diodes and the lamps are Western Electric Company 2Y lamps. It is to be emphasized that the above table of values is not intended to in any way limit the scope of the invention, but is provided only for exemplary purposes.

An alternative embodiment of the invention is shown in FIG. 2 and may be utilized to perform precisely the same tests as are performed by the preferred embodiment. The relay 11 is again arranged between two terminals 36 and 37 in an energizing circuit including a negative battery 38 and a push-button switch 39 so that energization thereof may be manually controlled. Each of the contacts $K_1$, $K_2$, $K_3$ . . . $K_n$ is received in a corresponding one of a plurality of parallel circuit portions $41_1$, $41_2$, $41_3$ . . . $41_n$, respectively. The first circuit portion $41_1$ includes an indicating lamp 42 and a negative source 43 (common to all of the circuit portions $41_1$ through $41_n$) and is arranged to complete an energizing circuit for the lamp 42 through the contacts $K_1$ upon closure thereof. Each of the remaining circuit portions $41_2$ through $41_n$ includes respectively a lamp $44_2$ through $44_n$ and a diode $46_2$ through $46_n$ connected through the associated contacts $K_2$ through $K_n$ across the terminals of the common negative source 43.

A silicon controlled rectifier 47 is provided for each set of contacts after the first in the prescribed break-contact sequence, and is identified with the corresponding set of contacts by the appropriate subscript, as are its constituent parts. A cathode 48 of each silicon controlled rectifier 47 is connected intermediate the corresponding indicating means 44 and diode 46. A gate circuit 49 includes a resistor 51 and a diode 52 and is connected intermediate the lamp 42 or 44 and the associated contacts in the circuit portion 41 corresponding to the next preceding set of contacts in the break-contact sequence. Finally, an anode circuit 53 of each silicon controlled rectifier 47 completes an alternate energizing circuit for the corresponding indicating lamp 44 across the terminals of the negative source 43.

The operation of this circuit is similar to that of the preferred test circuit and thus a brief explanation will suffice. Assuming all of the contacts $K_1$ through $K_n$ are properly closed in their normal condition, the lamps 42 and $44_2$ through $44_n$ are energized and a positive potential is applied to the respective gating circuit $49_2$ through $49_n$ of the corresponding silicon controlled rectifier $47_2$ through $47_n$. As before, however, a positive clamping bias is also applied to the respective cathode $48_2$ through $48_n$ of the corresponding silicon controlled rectifier $47_2$ through $47_n$ to clamp the same in a non-conductive condition.

Failure of any set of contacts to close properly in a normal condition will be indicated by non-energization of the associated indicating lamp 42 or $44_2$ through $44_n$. Failure of any set of contacts to open contact upon energization of the relay 11 will be indicated by continued energization of the corresponding lamp 42 or $44_2$ through $44_n$ after completion of the test. Also, failure of any set of contacts to break in the proper sequence will be indicated by continued energization of the corresponding indicating lamp $44_2$ through $44_n$ after completion of the test.

Thus the alternate test circuit identifies the set or sets of contacts which are defective in any of the above tests, but the corresponding indicating lamps cannot distinguish between a failure to break contact and a failure resulting from an improper break-contact sequence. That is, each of the indicating lamps $44_2$ through $44_n$ will remain energized after completion of the test for either a failure of the corresponding contacts to break contact or a failure of the corresponding contacts to break contact in proper sequence. However, this results in a simplification of the test circuit as compared to the preferred test circuit, and may be greatly advantageous in the appropriate application.

What is claimed is:
1. A circuit for ascertaining whether a series of contacts operate in a prescribed break sequence, which comprises:
   normally unoperated control means associated with each contact;
   means rendered effective upon the break of a contact prior to the break of a preceding contact for operating the control means associated with the preceding contact;
   first means associated with each contact and operated by the control means for indicating that the associated contact does not break before the succeeding contact; and
   second means for indicating the subsequent operation of the associated contact.

2. A circuit as set forth in claim 1, wherein:
   separate indicating means are provided for each switch after the first in the prescribed sequence, each of said indicating means being operated by the controlled means associated therewith, whereby the switch or switches which operate out of sequence are readily identifiable by energization of the associated indicating means.

3. A circuit as set forth in claim 1 wherein the contacts which are operated in a prescribed break sequence comprise the contacts of a relay.

4. A circuit for testing first whether a plurality of relay contacts break contact, and secondly whether the contacts break contact in a prescribed sequence, which comprises:
   a current source;
   first indicating means individually associated with each set of contacts and energizable by said source;
   a plurality of parallel circuit portions, one associated with each of said first indicating means and arranged to receive the corresponding set of contacts so that an energizing circuit is completed for the associated first indicating means as long as the contacts remain in their initial closed condition;

control means individually associated with each set of contacts after the first in the prescribed break-contact sequence, each of said control means being responsive to interruption of the corresponding circuit portion in the break-contact sequence, such that an alternate energizing circuit is provided for the first indicating means corresponding to the associated set of contacts only if the associated set opens before the next preceding set of contacts in the break-contact sequence; and second means for indicating the subsequent operation of the associated contact, whereby those of said indicating means which remain energized after completion of the test identify the set or sets of contacts which did not break contact at all or which broke contact out of sequence.

5. The test circuit as recited in claim 4, wherein the indicating means comprise:

first indicating means associated individually with each set of contacts, and connected to the corresponding circuit portion and the source so that an energizing circuit is completed therefor as long as the contacts remain in their initial closed condition; and second indicating means associated individually with each set of contacts after the first in the prescribed break-contact sequence and energizable by the source, each of said second indicating means being arranged in the corresponding circuit portion so that the associated control means may complete an alternate energizing circuit therefor if the associated contacts break contact out of sequence;

whereby those of said first indicating means which remain energized after completion of the test identify the set or sets of contacts which did not break contact, and those of said second indicating means which remain energized after the completion of the test identify the set or sets of contacts which broke contact out of sequence.

6. A circuit for automatically testing whether a plurality of relay contacts are closed in their normal condition, and upon energization of the relay whether the contacts break contact and further whether the contacts break contact in a prescribed sequence, which test circuit comprises:

means actuatable to energize the relay;

a current source;

a plurality of first parallel circuit portions, one associated individually with each set of contacts and arranged to receive the associated contacts therein;

first indicating means individually arranged in each of said first circuit portions and energizable by said current source so that an energizing circuit is completed therefor through the associated set of contacts as long as the contacts remain in their normal closed condition;

a plurality of second parallel circuit portions, one associated individually with each set of contacts after the first in the prescribed sequence and arranged to receive the associated contacts therein;

second indicating means individually arranged in each of said second circuit portions and energizable by said current source so that an energizing circuit is completed therefor through the associated set of contacts as long as the contacts remain in their normal closed condition; and control means individually associated with each set of contacts after the first in the prescribed sequence, each of said control means being responsive to interruption of the corresponding second circuit portion and to interruption of at least one of the first and second circuit portions associated with the next preceding set of contacts in the prescribed break-contact sequence, to complete an alternate energizing circuit for the associated second indicating means only if the contacts break contact out of sequence;

whereby those of said first and second indicating means which are not energized at the commencement of the test identify the set or sets of contacts which are not closed in their normal condition, those of said first indicating means which remain energized after actuation of said relay-energizing means and completion of the test identify the set or sets of contacts which failed to break contact, and those of said second indicating means which remain energized after completion of the test identify the set or sets of contacts which broke contact out of sequence.

7. In a circuit for testing the sequence of operation of a relay having a plurality of contact pairs which are successively opened upon energization of the relay;

a series of thyratron-like electronic devices each of which is individually associated with an individual contact pair, each of said electronic devices including three electrodes, a first of which initiates conduction between the other two and then relinquishes control;

means including a contact pair associated with each electronic device for biasing each of said control electrodes of the associated electronic devices to initiate conduction;

a plurality of means each individually associated with and including the contact pair associated with each next succeeding electronic device for applying a clamp bias to said other electrodes of each of said preceding electronic devices to hold each preceding electronic device from conduction; and means rendered effective upon opening of said succeeding contact pair to remove said clamp bias and following failure of a preceding contact pair to open for applying biasing potential to the other two electrodes of said preceding electronic device and for initiating conduction of said preceding electronic device.

8. In a circuit responsive to the operation of a device that normally interrupts a series of electrically conductive switches in successive increments, comprising:

thyratron-like switching means associated with each of said conductive switches having a normally disabled, unbiased transconductive path and a control electrode, said transconductive path being enabled by energizing said control electrode and forward biasing said transconductive path and disabled again by removing the bias;

first means connected through each of said electrically conductive switches for energizing the control electrode of the switching means associated with said switch; and second means associated with each succeeding electrically conductive switch and rendered effective upon interruption of said succeeding switch for forward biasing said transconductive path of the switching means associated with the preceding switch to initiate conduction therein following failure to interrupt said preceding switch whereby conduction of said thyratron-like switching means is indicative of the operation of said associated switch and said succeeding switch in the improper sequence.

References Cited

UNITED STATES PATENTS

| | | | |
|---|---|---|---|
| 2,586,999 | 2/1952 | Schwartz. | |
| 2,997,646 | 8/1961 | Voegtlen. | |
| 3,237,183 | 2/1966 | Eagen | 340—223 XR |

RUDOLPH V. ROLINEC, *Primary Examiner.*

E. L. STOLARUN, *Assistant Examiner.*

U.S. Cl. X.R.

340—223